United States Patent
Hong

(10) Patent No.: US 8,515,930 B2
(45) Date of Patent: Aug. 20, 2013

(54) MERGING A SCANNED DOCUMENT WITH AN EXISTING DOCUMENT ON A SERVER

(75) Inventor: Jiang Hong, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 31 days.

(21) Appl. No.: 12/872,829

(22) Filed: Aug. 31, 2010

(65) Prior Publication Data

US 2012/0050790 A1    Mar. 1, 2012

(51) Int. Cl.
*G06F 7/00*    (2006.01)

(52) U.S. Cl.
USPC .......................... 707/705; 358/1.14; 358/1.15

(58) Field of Classification Search
USPC ................................ 358/1.14, 1.15; 707/705
See application file for complete search history.

(56) References Cited

U.S. PATENT DOCUMENTS

| 5,412,710 | A | 5/1995 | Tanaka |
| 6,144,997 | A | 11/2000 | Lamming et al. |
| 7,755,788 | B2 * | 7/2010 | Corona ........................ 358/1.15 |
| 2002/0112037 | A1 | 8/2002 | Koss |
| 2003/0081250 | A1 | 5/2003 | Kimura |
| 2004/0034654 | A1 | 2/2004 | Simpson et al. |
| 2004/0172621 | A1 | 9/2004 | Guillorit |
| 2004/0181749 | A1 | 9/2004 | Chellapilla et al. |
| 2005/0134889 | A1 | 6/2005 | Nakazawa |
| 2006/0044587 | A1 | 3/2006 | Yoshida |
| 2006/0074849 | A1 * | 4/2006 | Lee .................................... 707/1 |
| 2006/0245003 | A1 | 11/2006 | Stumbo et al. |
| 2007/0019215 | A1 | 1/2007 | Yu |
| 2007/0019232 | A1 | 1/2007 | Kano |
| 2007/0027894 | A1 | 2/2007 | Bridges et al. |
| 2007/0208877 | A1 * | 9/2007 | Kelley et al. .................. 709/245 |
| 2007/0220475 | A1 | 9/2007 | Asahara |
| 2007/0236749 | A1 | 10/2007 | Henry et al. |
| 2007/0273925 | A1 | 11/2007 | Hong |
| 2008/0014906 | A1 | 1/2008 | Tysowaski et al. |
| 2008/0081666 | A1 | 4/2008 | Masera |
| 2008/0094666 | A1 | 4/2008 | Gordon et al. |
| 2008/0222655 | A1 | 9/2008 | Sato |
| 2008/0295156 | A1 | 11/2008 | Kitada et al. |

(Continued)

FOREIGN PATENT DOCUMENTS

EP    2264588 A2    12/2010

OTHER PUBLICATIONS

U.S. Appl. No. 12/873,034, filed Aug. 31, 2010, Office Action, Feb. 28, 2013.
U.S. Appl. No. 12/892,155, filed Sep. 28, 2010, Restriction Requirement, Feb. 28, 2013.

(Continued)

*Primary Examiner* — Eric A Rust
(74) *Attorney, Agent, or Firm* — Hickman Palermo Truong Becker Bingham Wong LLP; Daniel D. Ledesma

(57) ABSTRACT

An approach for processing scanned document data includes a document merging network service receiving a request for existing electronic document data. In response, the document merging network service identifies and providing, to a scanning device, identification data that identifies existing electronic document data. The existing electronic document data may be stored by a third party storage service. In response to user selection of an existing electronic document identified in the identification data, the scanning device transmits, to the document merging network service, scanned document data, data that identifies an existing electronic document, and location insertion data. The document merging network service merges the scanned document data at one or more locations in the existing electronic document based on the location insertion data.

19 Claims, 5 Drawing Sheets

(56) References Cited

U.S. PATENT DOCUMENTS

| | | |
|---|---|---|
| 2009/0021776 A1 | 1/2009 | Dolan |
| 2009/0024751 A1 | 1/2009 | Taniguchi et al. |
| 2009/0059273 A1 | 3/2009 | Tomita |
| 2009/0116052 A1* | 5/2009 | Matsuzawa .......... 358/1.14 |
| 2009/0171910 A1 | 7/2009 | Sarkeshik |
| 2009/0222534 A1 | 9/2009 | Kitada |
| 2009/0225172 A1 | 9/2009 | Tsuchiya |
| 2009/0258758 A1 | 10/2009 | Hickman et al. |
| 2009/0303505 A1 | 12/2009 | Yago |
| 2009/0319400 A1 | 12/2009 | Pratt |
| 2010/0079797 A1 | 4/2010 | Ohara |
| 2010/0082470 A1 | 4/2010 | Walach et al. |
| 2010/0149565 A1 | 6/2010 | Mori |
| 2010/0188419 A1 | 7/2010 | Ratnakar et al. |
| 2010/0241611 A1 | 9/2010 | Zuber |
| 2010/0293386 A1 | 11/2010 | Kezzou et al. |
| 2011/0019821 A1 | 1/2011 | Kino |
| 2011/0043853 A1 | 2/2011 | Omori |
| 2011/0085196 A1 | 4/2011 | Liu et al. |
| 2012/0050772 A1 | 3/2012 | Lu |
| 2012/0050819 A1 | 3/2012 | Hong |
| 2013/0021643 A1 | 1/2013 | Nuggehalli et al. |

OTHER PUBLICATIONS

U.S. Appl. No. 12/873,116, filed Aug. 31, 2010, Office Action, Oct. 4, 2012.
U.S. Appl. No. 12/871,528, filed Aug. 30, 2010, Office Action, Oct. 2, 2012.
U.S. Appl. No. 12/873,034, filed Aug. 31, 2010, Office Action, Oct. 11, 2012.
U.S. Appl. No. 12/892,155, filed Sep. 28, 2010, Office Action, Oct. 11, 2012.
U.S. Appl. No. 13/185,443, filed Jul. 28, 2011, Office Action, Sep. 6, 2012.
European Patent Office, Search Report in application No. 12166273.8-1228, dated Dec. 6, 2012, 5 pages.
U.S. Appl. No. 12/873,116, filed Aug. 31, 2010, Final Office Action, Jan. 16, 2012.
U.S. Appl. No. 12/873,116, filed Aug. 31, 2010, Office Action, mailed Apr. 11, 2013.
U.S. Appl. No. 13/034,282, filed Feb. 24, 2011, Office Action, mailed Apr. 26, 2013.
U.S. Appl. No. 12/873,034, filed Aug. 31, 2010, Final Office Action, mailed May 10, 2013.
U.S. Appl. No. 12/862,155, filed Sep. 28, 2010, Final Office Action, mailed May 22, 2013.

* cited by examiner

MERGING A SCANNED DOCUMENT WITH AN EXISTING DOCUMENT ON A SERVER

This invention relates generally to scanning technology, and more specifically, to an approach for processing scanned document data.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Many individuals and business organizations are scanning an increased number of printed documents. Maintaining documents in electronic form requires less space and allows documents to be accessed by multiple users, without having to make additional printed copies.

In some circumstances, a user may wish to merge scanned document data with existing document data. For example, a user instructs a scanning device to scan 150 pages of a document. The user then discovers that a particular page was inadvertently left out from the scan. One way to resolve the problem is for the user to cause the scanning device to rescan the 150 pages and including particular page. However, the rescan can take a significant amount of time to perform. Another way to resolve the problem is for the user to (1) cause the scanning device to scan only the particular page, (2) return to the his/her client computer, (3) access the 150-page scanned document and the additional page from network storage, (4) instruct third party software to generate a text-based version of both documents, (5) using word processing software, copy and paste the particular page into to 150-page document, and (6) save the merged document back to network storage. Clearly, this process is laborious and time-consuming for the user.

Based on the foregoing, there is a need for an approach for better merging scanned data with another set of electronic data.

SUMMARY

An approach is provided for merging scanned document data with other electronic data. A document merging network service executes on a network device receives (a) scanned document data that represents at least a portion of one or more printed documents that have been scanned by the scanning device and (b) existing document indication data that indicates first document data. The document merging network service receives this data from a scanning device over a network using an IP protocol. In response to receiving the scanned document data and the existing document indication data, the document merging network service retrieves the first document data and merges second document data with the first document data. The second document data is either the scanned document data or document data that is generated from the scanned document data.

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. Overview
II. Scanned Document Data Processing Architecture
  A. Scanning Device
  B. Cloud
  C. Clients
  D. Operation Panel
III. Merging Scanned Document Data
IV. Implementation Mechanisms

I. Overview

An approach is provided for processing scanned document data. A document merging network service executes on a network device receives (a) scanned document data that represents at least a portion of one or more printed documents that have been scanned by the scanning device and (b) existing document indication data that indicates first document data. The document merging network service receives this data from a scanning device over a network using an IP protocol. In response to receiving the scanned document data and the existing document indication data, the document merging network service retrieves the first document data and merges second document data with the first document data. The second document data is either the scanned document data or document data that is generated from the scanned document data.

II. Scanned Document Data Processing Architecture

Figure 1:
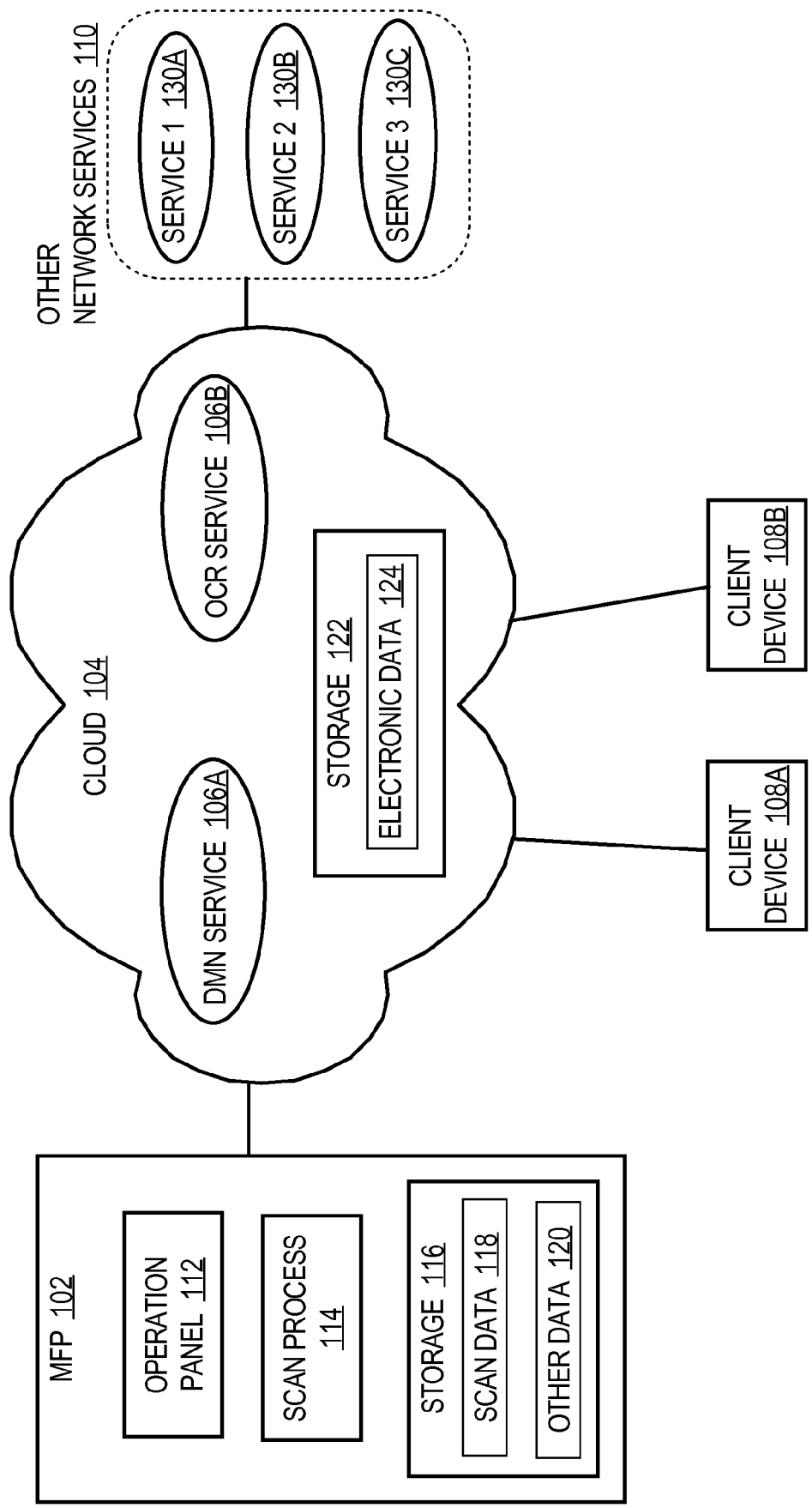
FIG. 1 is a block diagram that depicts an example architecture for processing scanned document data.

FIG. 1 is a block diagram that depicts an example architecture for processing scanned document data. Architecture 100 includes a scanning device 102, a cloud 104, client devices 108A, 108B, and other network services 110 that are each communicatively coupled to cloud 104. For illustration purposes only, other network services 110 includes services 130A-C. However, embodiments of the invention are not limited to these three network services. There may be any number (including zero) of other network services 110 that are communicatively coupled to cloud 104. The links between cloud 104 and each of scanning device 102, client devices 108A, 108B, and other network services 110 may be implemented by any medium or mechanism that provides for the exchange of data between the elements of FIG. 1. Examples of such links include, without limitation, a network such as a Local Area Network (LAN), Wide Area Network (WAN), Ethernet or the Internet, or one or more terrestrial, satellite or wireless links.

A. Scanning Device

Scanning device 102 is a device that includes the capability to scan one or more printed documents and generate scanned document data that represents the one or more printed documents. The scanned document data may be in a variety of formats, depending upon a particular implementation. One example format is the portable document format (PDF) by Adobe Systems, Inc. Scanning device 102 may also include a capability to convert scanned document data from a non-text format, such as PDF, to a text-based format, using for example, optical character recognition (OCR). Scanning device 102 may also include the capability to transmit the scanned document data to another location or device, for example, to a computer connected to the scanning device 102 or over a network to a network device. Examples of scanning device 102 include, without limitation, a scanner and a multi-function peripheral that includes one or more functions in addition to scanning, such as printing, copying, faxing, etc.

Scanning device 102 includes an operation panel 112, a scan process 114 and storage 116. The operation panel 112 is configured to display information to a user and to accept user input. The particular implementation of the operation panel 112 may vary depending upon a particular implementation. For example, the operation panel 112 may include a screen on which a graphical user interface (GUI) is displayed. In addition, the screen may be a touch screen that allows a user to select icons and GUI objects on the GUI. The GUI may be updated to reflect changes in the functionality offered by the scanning device 102. The operation panel 112 may also include control buttons and a numeric keypad for receiving user input. Operation panel 112 is described in more detail below with reference to FIG. 2.

Scan process 114 is configured to cause one or more printed documents to be scanned by scanning device 102 and generate scanned document data that represents the one or more printed documents. Scan process 114 may be initiated, for example, in response to a user selection of the start user control 208 or user selection of scan to phone GUI object 216.

Storage 116 may be any combination of volatile or non-volatile storage for storing data used by scanning device 102. For example, the storage 116 may be random access memory (RAM), one or more disks, or any combination of RAM and one or more disks for storing scanned document data. As depicted in FIG. 1, storage 116 may store scan data 118 and other data 120. Other data 120 may include other scan data or other types of data, such as word processing document files. Scanning device 102 may include other modules and processes that are not depicted in FIG. 1 for purposes of brevity.

B. Cloud

A "cloud" is a computing system providing access via the Internet to processing power, storage, software or other computing services, often via a web browser. Thus, cloud 104 is viewed as a collection of services from the perspective of scanning device 102 and client devices 108A and 108B. At the hardware level (although transparent to scanning device 102 and client devices 108A and 108B), cloud 104 comprises one or more network devices that host the plurality of services.

Each of the services in a cloud is accessible via the Internet using an IP protocol. Thus, each service in a cloud may be associated with a different IP address and/or port number.

A cloud may be maintained by a single individual or organization (e.g., company). However, multiple organizations may share responsibility in maintaining a particular cloud. A network service "outside" of a particular cloud (e.g., one of other network services 110) is provided by one or more individuals or organizations that are different than any individual or organization that maintains the particular cloud. Thus, other network services 110 are considered "third-party services" relative to the services in cloud 104.

In FIG. 1, cloud 104 includes a document merging network (DMN) service 106A. DMN service 106A processes scanned document data as described in more detail hereinafter.

Cloud 104 may also include an OCR service 106B for converting scanned document data in non-text format, for example PDF, into text-based format. Cloud 104 may also include a forwarding service 106C for transmitting scanned document data in text format to one or more recipients. OCR service 106B and forwarding service 106C are depicted in FIG. 1 as being separate from DMN service 106A for purposes of explanation, but OCR service 106B and forwarding service 106C may be implemented as being part of DMN service 106A.

Storage 122 may be implemented as any type of volatile or non-volatile storage for storing data used by DMN service 106A. For example, storage 122 may be random access memory (RAM), one or more disks, or any combination of RAM and one or more disks for storing scanned document data. Storage 122 stores electronic data, which may include scanned document data, text data (e.g., generated by OCR service 106B), and other types of data, such as image files and document files.

C. Clients

Client devices 108A, 108B receive scanned document data and/or text data from DMN service 106A, as described in more detail hereinafter. Client devices 108A, 108B may be implemented as any type of client device. Examples of client devices 108A, 108B include, without limitation, personal or laptop computers, workstations, cellular telephony devices such as cell phones, personal digital assistants (PDAs), etc.

D. Operation Panel

Figure 2:
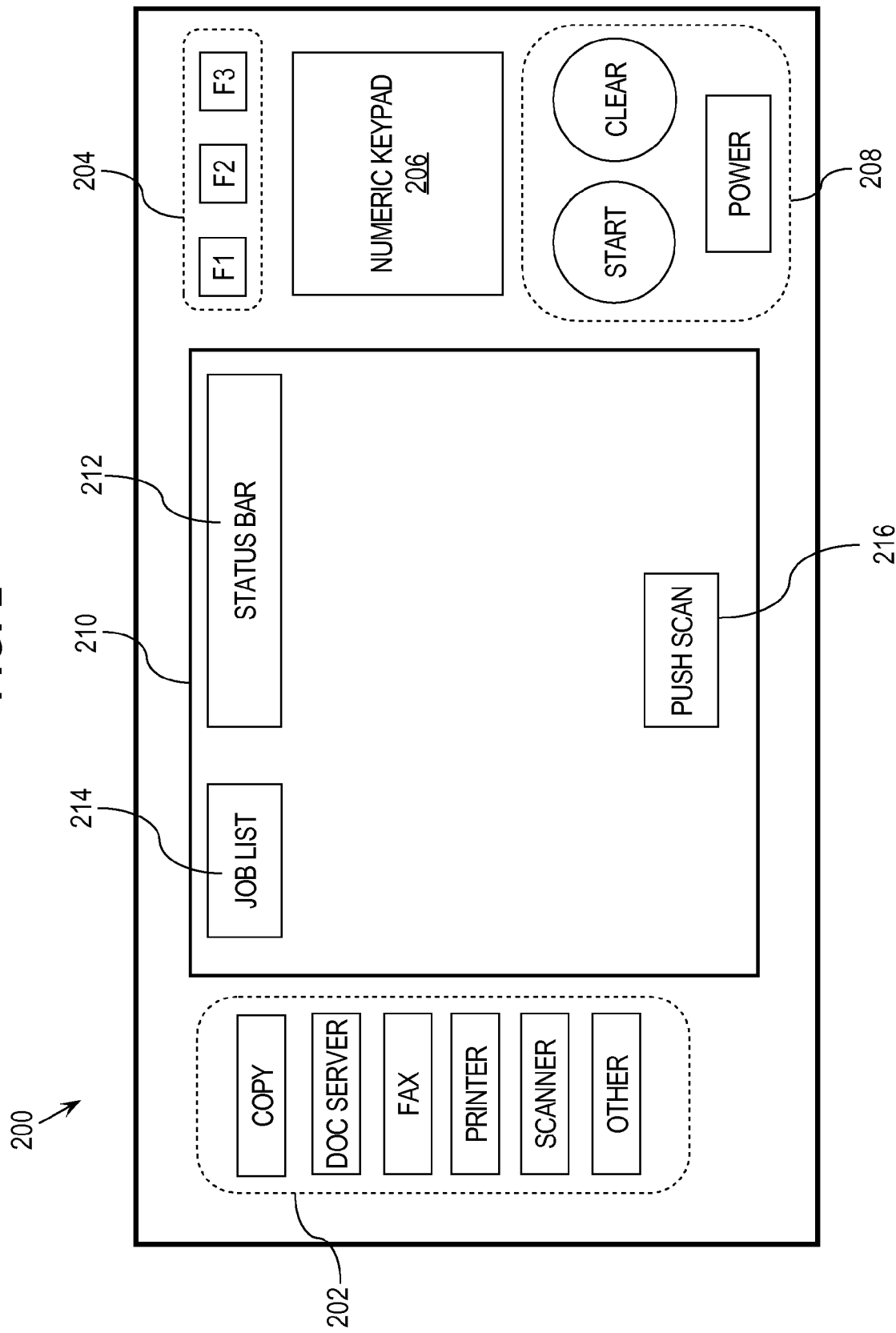
FIG. 2 depicts an example operation panel of a scanning device.

FIG. 2 depicts an example operation panel 200 of the scanning device 102. Operation panel 200 includes a set of user interface controls 202 for activating functions of the scanning device 102. The user interface controls on operation panel 200 may be graphical, non-graphical, or a combination of graphical and non-graphical. The functions depicted in FIG. 2 includes copy, connect to a document server, fax, print, copy and other functions. These functions are provided as examples of typical functions that may be implemented on a scanning device that is an MFP, but the functions implemented on any particular scanning device may vary depending upon the implementation. Operation panel 200 also includes a set of function buttons 204 that may be assigned to various functions provided on scanning device 102. Operation panel 200 also includes a numeric keypad 206 and a set of user controls 208 for toggling the power, starting a function, and clearing the current function. These are examples of the user controls that are typically included on a scanning device. More or fewer user controls may be provided, depending upon a particular implementation.

Operation panel 200 also includes a GUI 210 for displaying information and receiving user input. GUI 210 may be a touch screen that is capable of detecting user selection of icons and GUI objects displayed on GUI 210. GUI 210 may be stored on scanning device 102 and loaded directly from local storage of scanning device 102 (e.g., storage 116).

Alternatively, GUI 210 is provided by DMN service 106A or another service in cloud 104. A browser (not shown) executing on scanning device 102 may request GUI 210 from a service in cloud 104. The browser may send a HTTP request in response to selection of the scanning function on the set of UI controls 202 or upon startup of scanning device 102. In this way, GUI 210 may be updated remotely at any time before GUI 210 is loaded onto scanning device 102. Also, by relying on a service of cloud 104 for GUI 210, scanning device 102 is removed from the responsibility for persistently storing, updating, or otherwise maintaining GUI 210.

In the present example, GUI 210 includes a status bar GUI object 212 that displays status information, such as the status of the scanning device 102 or the status of one or more scan jobs. GUI 210 also includes a job list GUI object 214 which, when selected, displays a list of jobs associated with the scanning device 102, for example, scan jobs that have been processed and/or scan jobs that are currently being processed.

In an embodiment, GUI 210 includes a push scan GUI object 216. Additionally or alternatively, operation panel 200 includes a non-graphical (i.e., physical) button that causes the same operation(s) to be performed when selected as when push scan GUI object 216 is selected.

User selection of push scan GUI object 216 causes scanned document data to be merged with other document data (referred to herein as "existing document data"), as described in more detail hereinafter. As used herein, "merging" of scanned document data with existing document data includes adding at least a portion of the scanned document data to the existing document data and, optionally, removing or deleting at least a portion of the existing document data.

User selection of push scan GUI object 216 may initiate the scanning of one or more printed documents to generate the scanned document data that is to be merged with existing document data. Alternatively, one or more printed documents may be scanned prior to user selection of GUI object 216. Thus, in this scenario, user selection of GUI object 216 does not initiate the scanning of the one or more printed documents.

In an embodiment, operation panel 200 includes one or more UI controls for a user to identify existing electronic document data. The one or more UI controls may be presented (e.g., in GUI 210) in response to user selection of push scan GUI object 216. User selection of push scan GUI object 216 may cause scanning device 102 to generate and send a HTTP (or HTTPs) request to DMN service 106A, which, in response, provides a webpage with the one or more UI controls.

The existing document data (either other data 120 or electronic data 124 or both) may be stored in any format, such as PDF, JPG, GIF, TIFF, or DOC. The existing electronic document data may additionally or alternatively be stored outside of cloud 104 (i.e., maintained by a party or organization that is different than the party of organization that maintains cloud 104). For example, one of the other network services 110 may store and manage at least some of the existing document data. Non-limiting examples of services 130A-C include Box.net™, Google Docs™, Salesforce.com™, and Jigsaw™.

Existing document data may correspond to a single electronic document or multiple electronic documents. For example, existing document data may comprise one PDF file, one Word document, or any combination of one or more of PDF files, JPG files, Word documents, and other types of files.

In an embodiment, push scan GUI object 216 (or another UI control on operation panel 200), when selected, causes a list of documents and/or files (referred to herein as "documents") to be displayed via GUI 210. The documents indicated in the list may be stored locally or remotely relative to scanning device 102. Additionally or alternatively, user selection of push scan GUI object 216 causes a plurality of thumbnail images to be displayed via GUI 210, where each thumbnail image corresponds to a different electronic document.

In an embodiment, if the existing document data is stored remotely relative to scanning device 102 (i.e., in cloud 104 or in third party storage outside of cloud 104), then scanning device 102 sends a request for information about the existing document data to DMN service 106A. The request may be sent by a browser executing on scanning device 102. The request may be a HTTP (or HTTPs) request sent via an IP protocol. In response to receiving the request, DMN service 106A retrieves information about existing document data. The information about existing document data that is retrieved may be only associated with the user that initiated the request. For example, the request may include user data that identifies and/or authorizes the user. The user data may include a username and password or unique token that is associated with the user or a user account of the user. In this way, only existing document data that the user is authorized to retrieve is identified. Alternatively, the existing document data that is retrieved may be visible by multiple users. For example, existing document data may include one or more "public" electronic files that are accessible by any user that logs into scanning device 102 or by any user in a group with which the user is associated.

The request sent by scanning device 102 may be for entire electronic documents, for thumbnails of the existing documents, or only for data that identifies each electronic document (i.e., without requiring entire documents or even thumbnails of documents). Thus, the information that DMN service 106A retrieves and sends toward scanning device 102 may be data that only identifies each electronic document, data that includes thumbnails of the existing documents, or entire electronic documents.

In an embodiment, the only electronic document data that is transferred between scanning device 102 and cloud 104 is scanned document data that scanning device 102 transmits to DMN service 106A. In this way, all persistent storing of electronic document data and merging of electronic document data are performed by a network service in cloud 104 and/or one or more of other network services 110.

In an embodiment, operation panel 200 includes one or more UI controls that allow a user of scanning device 102 to specify where scanned document data is to be merged with existing document data. The UI controls may be contained in a webpage displayed via GUI 210. The location(s) in which scanned document data is to be merged with existing document data is referred to herein as "location insertion data." The one or more UI controls may allow the user to specify that the scanned document data is to be inserted at the beginning of an existing electronic document (i.e., prepend), at the end of the existing electronic document (i.e., append), or somewhere between the beginning and the end of the existing electronic document. In the latter scenario, the one or more UI controls may allow a user to specify a specific page, a specific paragraph, a specific image, a specific word, or a specific character (in an existing electronic document) after which or before which scanned document data is to be inserted. For example, the one or more UI controls allow a user to specify, with numeric keypad 206, a specific page number of an existing electronic document. In this example, the user is not required to view the existing electronic document when specifying the page number. As another example, the one or more UI controls allow a user to scroll through an existing electronic document to identify where, in the existing electronic document, the scanned document data is to be inserted. In a related example, the one or more UI controls allow a user to highlight a portion of an existing electronic document. The highlighted portion of the existing electronic document is later replaced with the scanned document data or at least with a portion of the scanned document data. Thus, location insertion data may indicate a range that corresponds to a contiguous set of characters or range of data in the existing electronic document that is to be replaced by the scanned document data.

In some scenarios, the scanned document data and the selected existing electronic document may be in different formats. For example, the scanned document data may be in a JPG format while the existing electronic document may be in a PDF format. As another example, the scanned document data may be in a PDF format while the existing electronic document may be in a Word document format. In such scenarios, one of the scanned document data or the existing electronic document is modified to be in a format (or a copy of one of the document data is created in a format) that is the same as the other electronic document data. For example, OCR service 106B performs optical character recognition on scanned document data (e.g., that is formatted as a PDF file) to generate a text-based version of the scanned document data. The text-based version is then converted into a Word document format. The Word document version of the scanned document data is then merged with an existing electronic document that is also in a Word document format.

In another embodiment, both scanned document data and an existing electronic document are modified (or copies of both are created) to be in the same format in order to perform a merge, regardless of whether the scanned document data and the existing electronic document are in the same or different format. For example, both the scanned document data and the existing electronic document are in a PDF format. Word document versions of each are created (e.g., by scanning device 102 or by OCR service 106B) and, subsequently, the merge operation is performed based on the Word document versions. As another example, the scanned document data is in a JPG format while the existing electronic document is in a PDF format. Word document versions of each are created and the merge operation is performed based on the Word document versions.

GUI 210 may include any number of other GUI objects depending upon a particular implementation, and the GUI objects depicted in FIG. 2 are provided as non-limiting examples.

III. Processing Scanned Document Data

Figure 3:
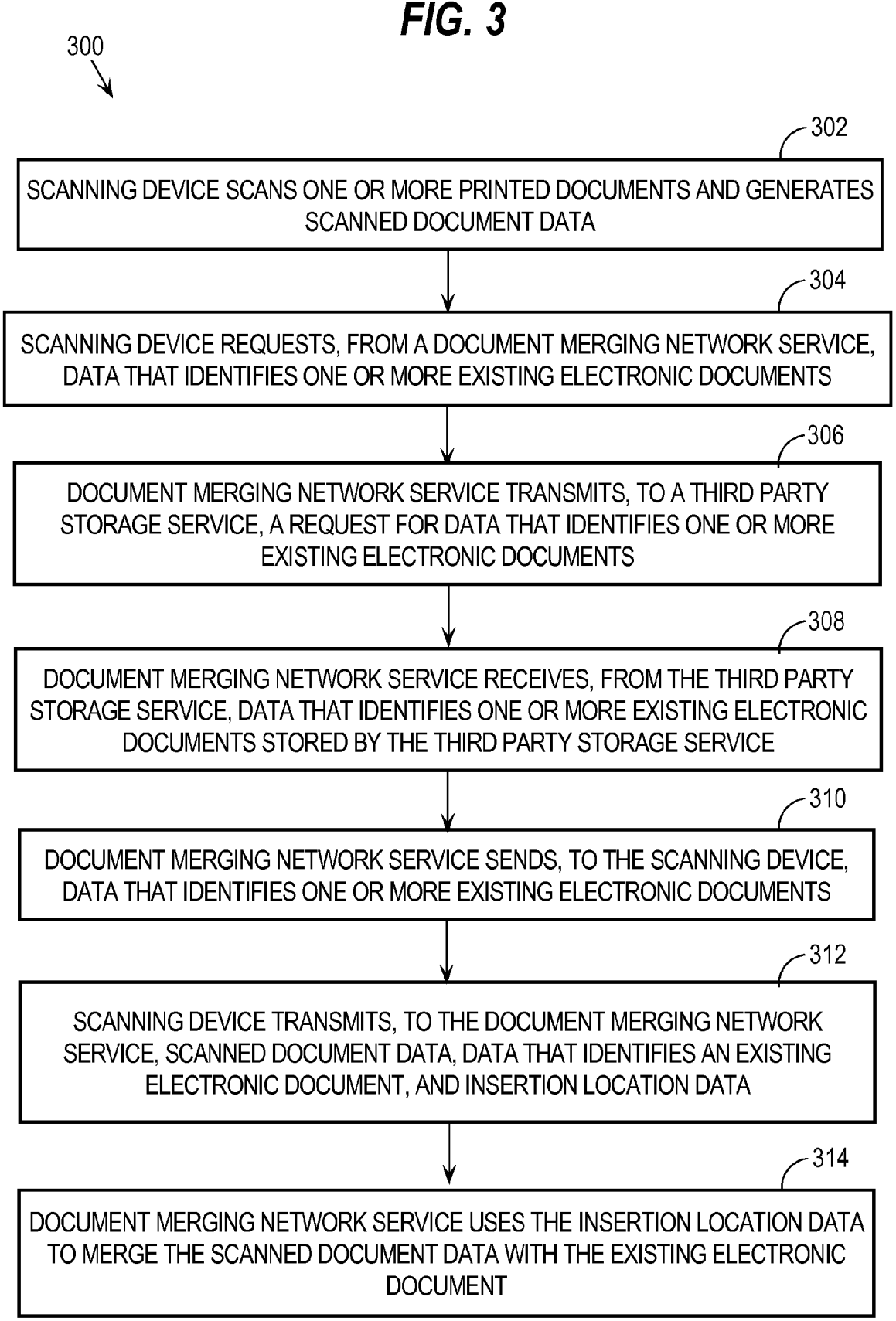
FIG. 3 is a flow diagram that depicts an approach for merging scanned document data with other electronic data.

FIG. 3 is a flow diagram 300 that depicts an approach for processing scanned document data, according to one embodiment of the invention. In step 302, a scanning device scans one or more printed documents and generates scanned document data. For example, a user may place into a feeder of scanning device 102 one or more printed documents and select the scan user interface control 202 or push scan GUI object 216 to initiate scanning.

In step 304, the scanning device requests, from a document merging network (DMN) service, data that identifies one or more existing electronic documents. The request may be for a webpage that lists a plurality of existing electronic documents (or files) (and, optionally, thumbnails of existing electronic documents) with which the scanned document data may be merged. For example, scanning device 102 sends an HTTP request via an IP protocol to DMN service 106A. The HTTP request may include data that uniquely identifies the user that initiated the scan of the one or more printed documents so that DMN service 106A can determine the list of existing electronic documents to send to scanning device 102. Alternatively, data that uniquely identifies the user may have been previously sent by scanning device 102 when the user logged on to scanning device 102.

DMN service 106A may identify existing electronic documents stored in storage 122 and/or third party storage, such as storage maintained by one or more of other network services 110.

In a related embodiment, DMN service 106A identifies existing electronic documents that are not necessarily associated with the user that initiated the scan. For example, some existing electronic documents are considered "public" electronic documents in that any user that logs into scanning device 102 is authorized to view such documents and cause scanned document data to be merged with such documents.

In an embodiment, the request transmitted from scanning device 102 to DMN service 106A in step 304 includes (a) data that identifies one of other network services 110 (e.g., service 130A) and, optionally, (b) authorization data that authorizes, to the network service, the user that initiated the scan. The authorization data may, for example, comprise a username and password entered by the user at scanning device 102 or a unique token that the network service previously generated. DMN service 106A may store the authorization data in association with a user account of the user that initiated the scan. In this way, a user is not required to enter third-party authorization data each time the user selects push scan GUI object 216. In this embodiment, in step 306, DMN service 106A transmits, to one of other network services 110, a request for existing electronic documents along with the user's authorization data.

In step 308, in response to the request, DMN service 106A receives, from the third party network service, data that identifies one or more existing electronic documents stored and maintained by the third party network service. DMN service 106A may combine this data with data that identifies one or more existing electronic documents stored in storage 122.

In step 310, the DMN service sends, to the scanning device, a webpage that contains a list of existing electronic documents. The list may comprise data that identifies electronic documents that are stored in storage 122 and data that identifies electronic documents that are stored by a third party network service, such as service 130A.

The webpage may include one or more UI controls for identifying an existing electronic document and for specifying location insertion data, i.e., where in an existing electronic document the scanned document data (or data generated therefrom) will be inserted. As noted above, DMN service 106A may retrieve information that identifies (e.g., in the form of a list) existing electronic documents from one or more of other network services 110 that stores existing electronic documents associated with the user (or with scanning device 102).

In step 312, the scanning device transmits, to the DMN service, scanned document data, data that identifies an existing electronic document, and location insertion data. For example, a user of scanning device 102 selects data that identifies, from the list displayed in step 310, a particular PDF document (e.g., that happens to be stored as part of electronic data 124 in storage 122) and identifies pages 5 and 6 of the particular PDF document as pages to be replaced by the scanned document data. Scanning device 102 transmits, to DMN service 106A, the scanned document data, data that identifies the particular PDF document, and location insertion data that identifies pages 5 and 6 of the particular PDF document. This data may be sent to a particular IP address that is associated with cloud 104 and that corresponds to DMN service 106A.

In step 314, the DMN service uses the location insertion data to merge the scanned document data with the identified existing electronic document. Prior to step 310, the DMN service may convert one or more of the scanned document data or the existing electronic document before the scanned document data is merged with the existing electronic document. For example, DMN service 106A may use OCR service 106B to process the received scanned document data and generate first text data. DMN service 106A may also use OCR service 106B (or another service) to process the existing electronic document and generate second text data, with which the first text data is later merged.

In an embodiment, location insertion data indicates not only a location in the existing electronic document (e.g., beginning, end, page number), but also indicates a portion of the existing electronic document to be replaced by the scanned document data. For example, location insertion data may indicate pages 13-21 of an existing electronic document. DMN service 106A, then, replaces pages 13-21 of the existing electronic document with the scanned document data, which may comprise more or less than nine pages. As another example, location insertion data may indicate pages 1, 10, and 21 of an existing electronic document and pages 1, 2, and 3 of the scanned document data. DMN service 106A then replaces pages 1, 10, and 21 of the existing electronic document with, respectively, pages 1, 2, and 3 of the scanned document data.

An optional step includes the document processing network service generating and transmitting a confirmation that indicates that the merging of the scanned document data with the identified existing electronic document has been completed. For example, DMN service 106A may generate and transmit a confirmation indicating that the scanned document data was merged with the identified existing electronic document. The confirmation may be sent to, for example, the user that initiated the scan at scanning device 102. In this situation, scanning device 102 may include in (or in conjunction with) the scanned document data, data that identifies scanning device 102 and/or the user who requested the scan of the one or more printed documents. The confirmation may be sent to one or more recipients, depending upon a particular implementation. For example, DMN service 106A may be configured to send the confirmation to a specified address, for example of a particular user or administrator.

Another optional step includes the document retrieving network service storing the scanned document data and/or the text data for later retrieval. For example, DMN service 106A may store in storage 122 scanned document data received by and/or processed by DMN service 106A. DMN service 106A may also store the generated text data in storage 122 for later retrieval. The scanned document data and the text data may be retrieved, for example by a user via scanning device 102 or a user or administrator via client device 108A or 108B.

The approach described herein for processing scanned document data provides a beneficial workflow for users. The approach allows a user to quickly and easily cause one or more printed documents to be scanned and cause the scanned document data to be merged with an existing electronic document, all with one or a few selections of one or more UI controls on a user interface of a scanning device.

Figure 4:
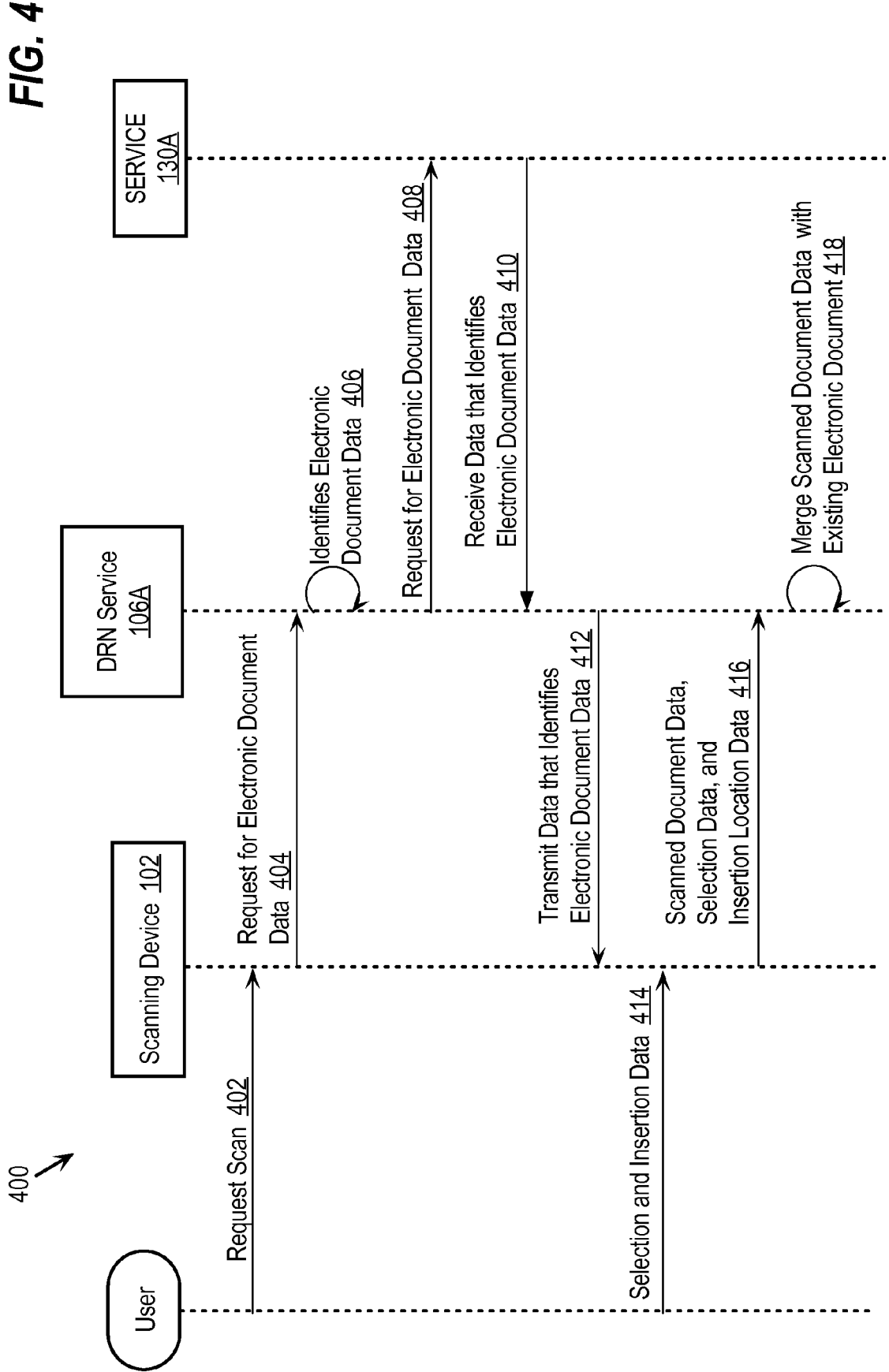
FIG. 4 is a message ladder diagram that depicts an example message exchange between the elements of FIG. 1 during the processing of scanned document data as described herein.

FIG. 4 is a message ladder diagram 400 that depicts an example message exchange between the elements of FIG. 1 during the processing of scanned document data as described herein. In step 402, a user requests that one or more printed documents be scanned. For example, a user may place one or more printed documents into an input bin of scanning device 102 and select push scan GUI object 216. In response to the user's selection of push scan GUI object 216, scanning device 102 scans the one or more printed documents and generates scanned document data. The scanned document data represents the one or more printed documents.

In step 404, also in response to the user's selection of push scan GUI object 216, scanning device 102 transmits a request (e.g., a HTTP request) to DMN service 106A for a webpage that lists information about existing electronic documents with which the scanned document data may be merged.

In step 406, DMN service 106A identifies electronic document data stored in cloud 104, e.g., in storage 122.

In step 408, DMN service 106A transmits, to one of other network services 110, a request for existing electronic documents along with authorization data associated with the user that initiated the scan.

In step 410, in response to the request, DMN service 106A receives, from the third party network service, data that identifies one or more existing electronic documents stored and maintained by the third party network service. DMN service 106A may combine this data with data that identifies one or more existing electronic documents stored in storage 122.

In step 412, DMN service 106A transmits, to scanning device 102, a webpage that identifies one or more existing electronic documents.

In step 414, scanning device 102 receives, from the user, input that selects one of the one or more existing electronic documents displayed on the webpage. Scanning device 102 may also receive input that identifies where, in the selected existing electronic document, the scanned document data (i.e., generated in step 402) is to be inserted. Scanning device 102 may also receive input that identifies one or more portions of the selected existing electronic document that are to be replaced by the scanned document data (or at least deleted without replacement by the scanned document data). This input is referred to as location insertion data.

In step 416, scanning device 102 transmits, to DMN service 106A, the scanned document data, data that identifies the selected electronic document, and the location insertion data. The transmission may be performed in response to user input, at scanning device 102, that submits the data selected by the user.

In step 418, DMN service 106 merges the scanned document data with the selected electronic document based on the location insertion data.

IV. Implementation Mechanisms

Although the flow diagrams of the present application depict a particular set of steps in a particular order, other implementations may use fewer or more steps, in the same or different order, than those depicted in the figures.

According to one embodiment of the invention, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
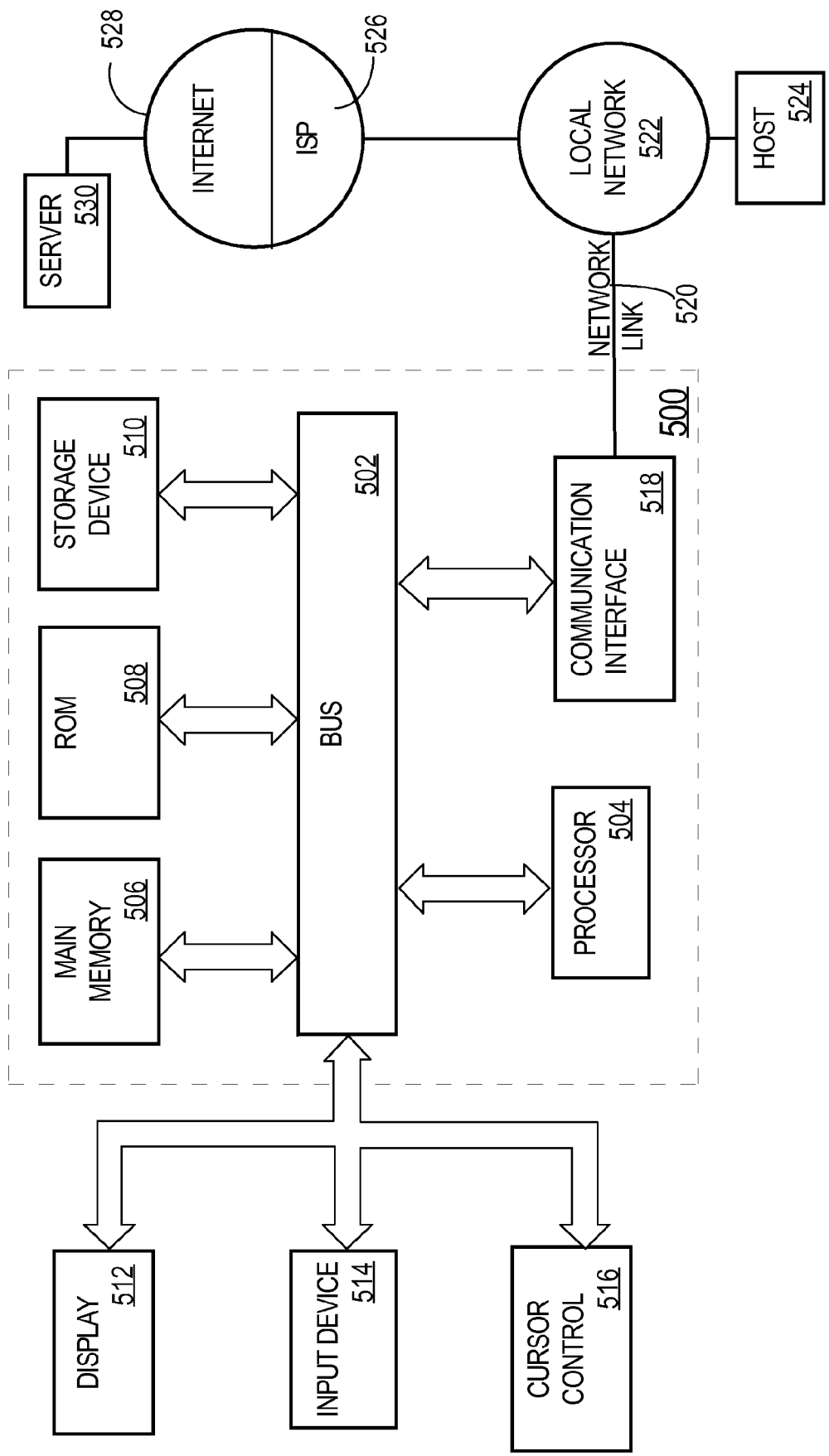
FIG. 5 is a block diagram of a computer system on which embodiments of the invention may be implemented.

FIG. 5 is a block diagram that depicts an example computer system 500 upon which embodiments of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic or computer software which, in combination with the computer system, causes or programs computer system 500 to be a special-purpose machine. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific manner. In an embodiment implemented using computer system 500, various computer-readable media are involved, for example, in providing instructions to processor 504 for execution. Such a medium may take many forms, including but not limited to, non-volatile media and volatile media. Non-volatile media includes, for example, optical or magnetic disks, such as storage device 510. Volatile media includes dynamic memory, such as main memory 506. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is, and is intended by the applicants to be the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable media storing instructions for processing scanned document data, where the instructions, when processed by one or more processors, cause:

receiving, by a document merging network service executing on a network device, from a first scanning device over a network using an IP protocol, (a) first scanned document data that represents at least a portion of one or more first printed documents that have been scanned by the first scanning device, (b) first existing document indication data that indicates first document data, and (c) location insertion data that indicates a location within the first document data in which second document data is to be inserted;

in response to receiving the first scanned document data and the first existing document indication data, the document merging network service:

retrieving the first document data, and merging the second document data with the first document data by inserting the second document data into the first document data at the location;

wherein the second document data is either the first scanned document data or document data that is generated from the first scanned document data;

receiving, by the document merging network service executing on the network device, from a second scanning device, that is different than the first scanning device, over the network using the IP protocol, (d) second scanned document data that represents at least a portion of one or more second printed documents that have been scanned by the second scanning device and (e) second existing document indication data that indicates third document data;

in response to receiving the second scanned document data and the second existing document indication data, the document merging network service:

retrieving the third document data, and merging fourth document data with the third document data;

wherein the fourth document data is either the second scanned document data or document data that is generated from the second scanned document data.

2. The one or more non-transitory computer-readable media as recited in claim 1, wherein retrieving the first document data comprises retrieving the first document data from storage that is located on the network device or on a second network device that is in the same local network as the network device.

3. The one or more non-transitory computer-readable media as recited in claim 1, wherein retrieving the first document data comprises the document merging network service:

requesting, using the IP protocol, the first document data from a third party storage service; and receiving the first document data from the third party storage service.

4. The one or more non-transitory computer-readable media as recited in claim 1, wherein the location insertion data indicates a particular character in the first document data.

5. The one or more non-transitory computer-readable media as recited in claim 1, wherein:

a file format of the first scanned document data is different than a file format of the first document data;

the instructions, when processed by the one or more processors, further cause generating the second document data from the first scanned document data;

a file format of the second document data is the same as a file format of the first document data.

6. The one or more non-transitory computer-readable media as recited in claim 1, wherein merging second document data with the first document data includes replacing less than all of the first document data with at least a portion of the second document data.

7. The one or more non-transitory computer-readable media as recited in claim 1, wherein the location insertion data indicates at least one of:

the beginning of the first document data;

the end of the first document data; or a page number of the first document data.

8. One or more non-transitory computer-readable media storing instructions which, when processed by one or more processors, cause:

a document merging network service executing on a network device receiving, from a scanning device over a network using an IP protocol, (a) scanned document data that represents at least a portion of one or more printed documents that have been scanned by the scanning device and (b) existing document indication data that indicates first document data;

in response to receiving the scanned document data and the existing document indication data, the document merging network service:

retrieving the first document data, and merging second document data with the first document data;

wherein the second document data is either the scanned document data or document data that is generated from the scanned document data in response to receiving the existing document indication data and prior to merging, the first document data is generated from third document data;

wherein a file format of the second document data is the same as a file format of the first document data.

9. The one or more non-transitory computer-readable media as recited in claim 8, wherein a second network service that is different than the document merging network service generates the first document data from the third document data.

10. The one or more non-transitory computer-readable media as recited in claim 8, wherein retrieving the first document data comprises retrieving the first document data from storage that is located on the network device or on a second network device that is in the same local network as the network device.

11. The one or more non-transitory computer-readable media as recited in claim 8, wherein retrieving the first document data comprises the document merging network service:

requesting, using the IP protocol, the first document data from a third party storage service; and receiving the first document data from the third party storage service.

12. The one or more non-transitory computer-readable media as recited in claim 8, wherein:

a file format of the scanned document data is different than the file format of the first document data;

the instructions, when processed by the one or more processors, further cause generating the second document data from the scanned document data;

the file format of the second document data is the same as the file format of the first document data.

13. The one or more non-transitory computer-readable media as recited in claim 8, wherein merging second document data with the first document data includes replacing less than all of the first document data with at least a portion of the second document data.

14. The one or more non-transitory computer-readable media as recited in claim 8, wherein the instructions, when processed by the one or more processors, further cause:

the document merging network service also receiving, from the scanning device over the network, location insertion data;

wherein the location insertion data indicates a location within the first document data in which the second document data is to be inserted;

the document merging network service inserting the second document data into the first document data at the location.

15. The one or more non-transitory computer-readable media as recited in claim 14, wherein the location insertion data indicates at least one of:

the beginning of the first document data;

the end of the first document data; or a page number of the first document data.

16. A scanning device comprising:

one or more processors;

wherein the scanning device is configured to generate scanned document data based on one or more printed documents; and one or more user interface controls;

wherein the one or more user interface controls are configured to allow:

(a) a user to specify particular document data that is different than the scanned document data, and (b) the user to specify that the scanned document data is to be merged with the particular document data, (c) the user to specify a plurality of locations within the particular document data in which one or more portions of the scanned document data are to be inserted, wherein at least one of the plurality of locations is neither the beginning nor the end of the particular document data;

wherein the scanning device is configured to send, using an IP protocol, to a document merging network service executing on a network device, the scanned document data, data that identifies the particular document data, and location data that indicates the plurality of locations in the particular document data where one or more portions of the scanned document data are to be merged with the particular document data.

17. The scanning device of claim 16, wherein the particular document data is stored on a device that is separate from the scanning device.

18. The scanning device of claim 16, wherein at least one of the one or more portions of the scanned document data replaces less than all of the particular document data.

19. The scanning device of claim 18, wherein the at least one of the plurality of locations indicates a particular character in the particular document data.

\* \* \* \* \*